United States Patent
Petropoulos et al.

(10) Patent No.: US 11,671,535 B1
(45) Date of Patent: Jun. 6, 2023

(54) HIGH FIDELITY CALL CENTER SIMULATOR

(71) Applicant: United Services Automobile Association (USAA), San Antonio, TX (US)

(72) Inventors: Lambros Petropoulos, San Antonio, TX (US); John Michael Lombard, Seattle, WA (US); Atesmachew Bizuwerk Hailegiorgis, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/172,950

(22) Filed: Feb. 10, 2021

Related U.S. Application Data (63) Continuation-in-part of application No. 17/064,869, filed on Oct. 7, 2020, which is a continuation of (Continued)

(51) Int. Cl.
*H04M 3/00* (2006.01)
*H04M 5/00* (2006.01)
(Continued)

(52) U.S. Cl.
CPC .......... *H04M 3/5234* (2013.01); *G10L 25/63* (2013.01); *H04M 3/42059* (2013.01);
(Continued)

(58) Field of Classification Search
CPC ............. H04M 3/5175; H04M 3/5191; H04M 3/5233; H04M 3/5232; H04M 2201/42; H04M 3/5183; H04M 3/5237; H04M 2203/402; H04M 3/523; H04M 3/5235; H04M 2203/551; H04M 2203/408; H04M 3/51; H04M 3/42314; H04M 3/42323; H04M 3/2218; H04M 3/42161; G06F 3/0482; G06F 8/34; G06F 3/04817; G06F 8/38
(Continued)

(56) References Cited

U.S. PATENT DOCUMENTS

5,590,188 A  12/1996  Crockett
6,553,113 B1  4/2003  Dhir et al.
(Continued)

*Primary Examiner* — Kharye Pope
(74) *Attorney, Agent, or Firm* — BakerHostetler (57) ABSTRACT

Systems, methods, and computer program products provide a digital twin of a call center or call center network, including the members, representatives, and algorithms therein. The digital twin can be used to model real-world call centers and call center networks or may be modified to test changes (in the center/network's control such as algorithms or representative staffing, or beyond the center network's controls such as callers) before they are implemented in real-world production environments. Call loads, which may be based on real call loads or generated differently, can be used to test current or contemplated call center/network arrangements. The digital twin can be validated through comparison with data received from the real-world call center(s)/network(s) it models.

20 Claims, 6 Drawing Sheets

Related U.S. Application Data application No. 15/426,874, filed on Feb. 7, 2017, now Pat. No. 10,834,264, which is a continuation of application No. 15/066,132, filed on Mar. 10, 2016, now Pat. No. 10,498,897.

(60) Provisional application No. 62/292,979, filed on Feb. 9, 2016, provisional application No. 62/140,748, filed on Mar. 31, 2015.

(51) Int. Cl.
*H04L 12/66* (2006.01)
*H04M 3/523* (2006.01)
*G10L 25/63* (2013.01)
*H04M 3/42* (2006.01)

(52) U.S. Cl.
CPC ....... *H04M 3/5232* (2013.01); *H04M 3/5237* (2013.01); *H04M 3/5238* (2013.01); *H04M 2203/551* (2013.01)

(58) Field of Classification Search
USPC ............ 379/265.09, 265.02, 265.01, 265.11, 379/265.12, 265.03, 266.01, 266.07, 379/266.08, 265.05, 88.09, 265.06; 705/7.14, 7.13, 7.12, 348, 7.39, 7.38; 370/352

See application file for complete search history.

(56) References Cited

U.S. PATENT DOCUMENTS

| | | |
|---|---|---|
| 7,313,613 B1 | 12/2007 | Brooking et al. |
| 7,536,002 B1 | 5/2009 | Ma et al. |
| 7,593,904 B1 | 9/2009 | Kirshenbaum et al. |
| 8,289,845 B1 | 10/2012 | Baldonado et al. |
| 8,306,908 B1 | 11/2012 | Barker et al. |
| 8,787,552 B1 | 7/2014 | Zhao et al. |
| 8,825,513 B1 | 9/2014 | Misra et al. |
| 10,096,068 B1 | 10/2018 | Ross et al. |
| 2003/0200135 A1 | 10/2003 | Wright |
| 2004/0062380 A1 | 4/2004 | Delaney |
| 2004/0193475 A1 | 9/2004 | Hemm et al. |
| 2005/0129217 A1* | 6/2005 | McPartlan ........ H04M 3/5232 379/266.08 |
| 2006/0072737 A1 | 4/2006 | Paden et al. |
| 2006/0227961 A1* | 10/2006 | Lai .................... H04M 3/5237 379/265.11 |
| 2006/0265090 A1* | 11/2006 | Conway ............. H04M 3/5175 700/94 |
| 2007/0036329 A1 | 2/2007 | Joseph et al. |
| 2007/0189497 A1 | 8/2007 | Bareis |
| 2008/0095355 A1 | 4/2008 | Mahalaha et al. |
| 2008/0130842 A1* | 6/2008 | Johri .................. H04M 3/2281 379/88.04 |
| 2008/0167952 A1 | 7/2008 | Blair |
| 2008/0288339 A1 | 11/2008 | Streeter et al. |
| 2009/0157449 A1 | 6/2009 | Itani et al. |
| 2009/0171668 A1 | 7/2009 | Sneyders et al. |
| 2009/0180607 A1* | 7/2009 | Kamlet .............. H04M 3/5233 379/265.12 |
| 2009/0190740 A1 | 7/2009 | Chishti et al. |
| 2009/0190744 A1 | 7/2009 | Xie et al. |
| 2009/0248418 A1 | 10/2009 | Jaiswal et al. |
| 2010/0017263 A1 | 1/2010 | Zernik et al. |
| 2010/0020959 A1 | 1/2010 | Spottiswoode |
| 2010/0082839 A1 | 4/2010 | Brunson et al. |
| 2010/0158238 A1* | 6/2010 | Saushkin ............. G10L 25/48 379/265.12 |
| 2010/0169147 A1 | 7/2010 | McCormack et al. |
| 2011/0069821 A1 | 3/2011 | Korolev et al. |
| 2011/0270771 A1 | 11/2011 | Coursimault et al. |
| 2011/0313900 A1 | 12/2011 | Falkenborg et al. |
| 2012/0017324 A1 | 1/2012 | Goblirsch et al. |
| 2012/0148040 A1 | 6/2012 | Desai et al. |
| 2012/0173243 A1 | 7/2012 | Anand et al. |
| 2013/0223613 A1 | 8/2013 | Birk et al. |
| 2013/0251137 A1 | 9/2013 | Chishti et al. |
| 2013/0282430 A1 | 10/2013 | Kannan et al. |
| 2014/0006861 A1 | 1/2014 | Jain et al. |
| 2014/0023186 A1 | 1/2014 | Srinivas et al. |
| 2014/0067503 A1 | 3/2014 | Ebarle Grecsek et al. |
| 2014/0079207 A1* | 3/2014 | Zhakov ............. H04M 3/5233 379/265.03 |
| 2014/0115176 A1 | 4/2014 | Kamboh et al. |
| 2014/0140494 A1* | 5/2014 | Zhakov ............. H04M 3/5183 379/265.03 |
| 2014/0146960 A1 | 5/2014 | Williams |
| 2014/0172627 A1 | 6/2014 | Levy et al. |
| 2014/0207494 A1 | 7/2014 | Rowell |
| 2014/0220526 A1* | 8/2014 | Sylves ............. G06Q 10/06395 434/238 |
| 2014/0249873 A1* | 9/2014 | Stephan ............. G06Q 10/063 705/7.11 |
| 2014/0355748 A1 | 12/2014 | Conway et al. |
| 2015/0032508 A1 | 1/2015 | Lotlikar et al. |
| 2015/0172257 A1* | 6/2015 | Truitt ................... G06Q 30/016 726/7 |
| 2015/0215463 A1 | 7/2015 | Shaffer et al. |
| 2015/0215464 A1 | 7/2015 | Shaffer et al. |
| 2015/0296082 A1* | 10/2015 | Saushkin ............. G06V 40/23 379/265.11 |
| 2015/0347951 A1 | 12/2015 | Tamblyn et al. |
| 2016/0005070 A1 | 1/2016 | Burr et al. |
| 2016/0015008 A1 | 1/2016 | Bunderson |
| 2016/0057284 A1* | 2/2016 | Nagpal ............. H04M 3/5232 379/266.07 |
| 2016/0078544 A1 | 3/2016 | Brady |
| 2016/0117628 A1* | 4/2016 | Brophy .................. G06F 40/40 704/2 |
| 2016/0150087 A1 | 5/2016 | Nowak et al. |
| 2016/0283888 A1 | 9/2016 | Laing et al. |
| 2017/0155764 A1 | 6/2017 | Zampiello |

\* cited by examiner

FIG. 6 ns a continuation-in-part application claims priority to, and the benefit of, U.S. patent application Ser. No. 17/064, 869, filed Oct. 7, 2020; which claims the benefit of and is a continuation of U.S. patent application Ser. No. 15/426,874, filed Feb. 7, 2017 (now U.S. Pat. No. 10,834,264); which claims the benefit of and is a continuation of U.S. patent application Ser. No. 15/066,132, filed Mar. 10, 2016 (now U.S. Pat. No. 10,498,897); which claims the benefit and priority of U.S. Provisional Patent Appl. No. 62/292,979, filed Feb. 9, 2016; and which claims the benefit and priority of U.S. Provisional Patent Appl. No. 62/140,748, filed Mar. 31, 2015; all of which are hereby incorporated by reference in their entireties.

HIGH FIDELITY CALL CENTER SIMULATOR

CROSS-REFERENCE TO RELATED APPLICATIONS

This continuation-in-part application claims priority to, and the benefit of, U.S. patent application Ser. No. 17/064, 869, filed Oct. 7, 2020; which claims the benefit of and is a continuation of U.S. patent application Ser. No. 15/426,874, filed Feb. 7, 2017 (now U.S. Pat. No. 10,834,264); which claims the benefit of and is a continuation of U.S. patent application Ser. No. 15/066,132, filed Mar. 10, 2016 (now U.S. Pat. No. 10,498,897); which claims the benefit and priority of U.S. Provisional Patent Appl. No. 62/292,979, filed Feb. 9, 2016; and which claims the benefit and priority of U.S. Provisional Patent Appl. No. 62/140,748, filed Mar. 31, 2015; all of which are hereby incorporated by reference in their entireties.

TECHNICAL FIELD

The present disclosure generally relates to load-balancing and, more specifically, to anticipating the effects of changing load balance parameters on multiple call centers.

BACKGROUND

Effective call center management remains an important but as of yet elusive goal. Because call centers are often a key client-facing side of the business, effective call center management may be crucial to maintaining client relationships. Accordingly, there remains an important unmet need for tools that enable more effective call center management.

Effective load-balancing algorithms are essential to distributing call volumes across multiple call centers without negatively impacting performance of one or more of the multiple call centers. Due to the coupled nature of call centers in a multiple-call-center arrangement, load-balancing algorithms are more effectively tested across all call centers in the arrangement, rather than testing at one call center at a time. Thus, testing and modifying load-balancing generally affects customers and customer service representatives. Additional parameters, controls, and managerial techniques, when utilized untested in a "live" production environment employing representatives and serving members or customers, and consuming technological resources, can risk degradation of service levels or increased costs.

There is a need for an environment or simulation of interrelated multiple call centers in which different load-balancing algorithms can be tested and modified without disrupting customer service operations at the call centers.

SUMMARY

In an embodiment, a non-transitory computer-readable medium stores instructions. When executed by a processor, the instructions perform a method comprising: ingesting, via an interface with a call center network, member data representing one or more attributes of members associated with one or more calls to the call center network; ingesting, via an interface with the call center network, representative data representing one or more attributes of representatives handling the one or more calls to the call center network; ingesting, via an interface with the call center network, routing data representing routing logic for assigning the one or more calls to a respective one of the representatives; generating a digital twin of the call center network based on the member data, the representative data, and the routing data; providing simulated call load data to the digital twin; calculating performance of the call center network based on handling of the simulated call load by the digital twin; and providing an output representing the performance.

In an embodiment, a non-transitory computer-readable medium stores instructions. When executed by a processor, the instructions effectuate: a simulator module; a customer management engine configured to ingest member data representing one or more attributes of members associated with one or more calls to a call center network; a representative management engine configured to ingest representative data representing one or more attributes of representatives handling the one or more calls to the call center network; and a routing engine configured to ingest routing data representing routing logic for assigning the one or more calls to a respective one of the representatives, wherein the simulator module is configured to generate a digital twin of the call center network based on the member data, the representative data, and the routing data.

In an embodiment, a computer program product is stored on a non-transitory computer-readable medium. The computer program product is configured to: ingest, via an interface with a call center network, member data representing one or more attributes of members associated with one or more calls to the call center network; ingest, via an interface with the call center network, representative data representing one or more attributes of representatives handling the one or more calls to the call center network; ingest, via an interface with the call center network, routing data representing routing logic for assigning the one or more calls to a respective one of the representatives; generate a digital twin of the call center network based on the member data, the representative data, and the routing data; provide simulated call load data to the digital twin; calculate performance of the call center network based on handling of the simulated call load by the digital twin; and provide an output representing the performance.

DETAILED DESCRIPTION

The problem addressed by this disclosure is to determine a reliable, accurate manner for developing new load-balancing and call center/call center network management techniques that allows for realistic, predictive testing of parameters or variables (e.g., load-balancing algorithms; representative training/skilling, staffing, and scheduling; vendor engagement to supplement internal representative capacity; procurement or retirement of new hardware and software; geographic locations of call centers or representatives; et cetera) across a variety of call load scenarios (e.g., average; maximum; minimum; statistical outlier periods such as after or during a large-scale event (e.g., weather, change in law or regulation, pandemic, et cetera); on particular times or days (e.g., of week, of month, of year) when traffic surges or ebbs; and so forth, at granularity levels including representative, unit, call center, and network).

Balancing incoming calls to a call center (or network), and otherwise managing call centers (e.g., according to staffing, vendor engagement, procured or active technology resources) may depend upon numerous, dynamic factors, including the availability of customer service agents ("agents"), the skill level of agents, whether the agents are automated systems or human service representatives, a characteristics of the customer, a type of incoming call, an issue related to the call, call abandonment (e.g., a customer terminating the call before the call is answered by the agent), or the like. Balancing incoming calls to an arrangement of multiple calling centers may depend upon numerous, dynamic factors, including the routing protocols of the calling centers, skill levels of agents at the call centers, the number of agents at each call center, call complexity, forecasted and actual call volumes, wait times, call abandonments, customer characteristics, and the like. This multifactor load-balancing methodology may be refined and tweaked through experimentation or trial-and-error. That is, testing new load-balancing settings or measures may benefit from seeing these changes applied in practice. The disclosed systems and methods provide a simulation of a multi-call center system in which new load balance settings or measures may be applied and evaluated prior to launching such measures in practice.

As used herein, a "digital twin" is a digital or data replica, or a virtual object representing another system or entity. Digital twins are dynamic; they represent the system or entity over a period of time (up to and including, but not necessarily requiring, the lifecycle). Digital twins can be implemented as simulations or models, which can be implemented based on historical data of the system or entity (e.g., call center, call center environment, call center network) being replicated, projected data representative of the system or entity, real-time data received from or about the system or entity, or combinations thereof. In embodiments, a simulation or model may be a digital twin if it includes or correctly models all or a certain threshold of data available. In embodiments, the digital twin can be tested and validated periodically or on an ongoing basis to confirm the digital twin accurately represents the real-world system or entity to a degree of accuracy or precision, which may include, but need not approach, identical variables, performance, behavior, et cetera. In the context of a call center, a digital twin can simulate or model some or all measurable variables, including industry, size, location(s), hardware, representatives, schedules, customers, et cetera. In the context of call center management, digital twin modeling can replace approximate queuing theory models to improve models and simulations and provide improved performance for users of models intended to facilitate understanding and management of call centers.

While aspects herein refer to a "call" or "calls," it is understood that "call" may be used to refer to any type of contact from a member to representative or organization. When specified, calls may be voice calls, but in alternative embodiments texts, web or app messages, emails, or other communication means may be used interchangeably with "calls" without departing from the scope or spirit of the innovation.

Figure 1:
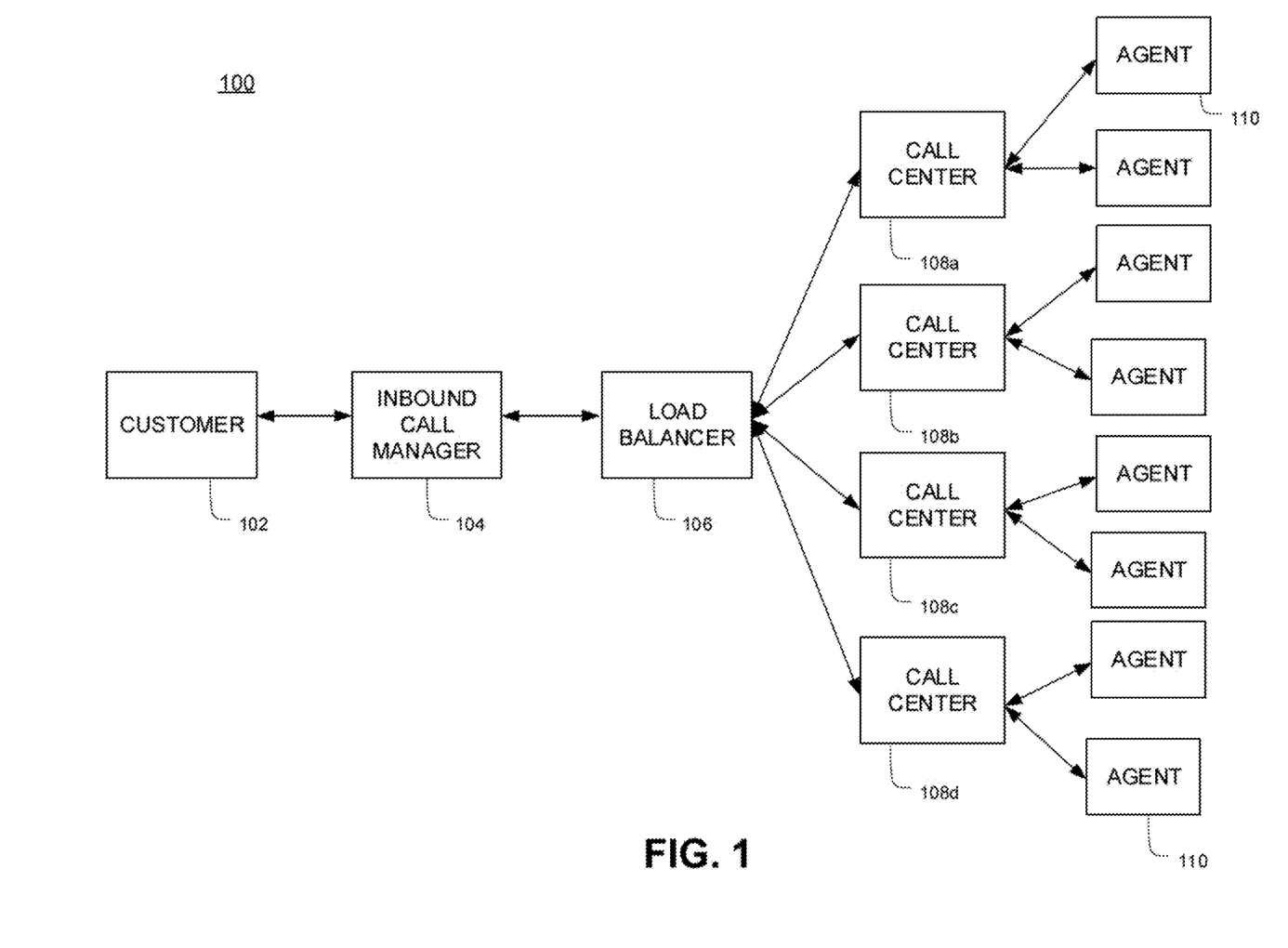
FIG. 1 is a block diagram of an example arrangement of multiple call centers.

Now referring to the drawings, wherein like reference numbers refer to like elements, there is illustrated an example environment 100 that may be simulated using the disclosed technology, in accordance with an aspect of the disclosure. As shown in FIG. 1, for example, environment 100 may represent a data flow as part of providing customer service to a customer 102. Customer 102 may call or otherwise initiate communication with a service provider. The communication may be routed to an inbound call manager 104.

From customer 102, inbound call manager 104 may obtain information related to customer 102 or the desired service. For example, input call manager 104 may comprise an automated system that requests information from customer 102. In an aspect, inbound call manager 104 may comprise an interactive voice response (IVR) solution that uses prerecorded prompts and menus to present information or options to customer 102. In response, customer 102 may provide information, such as identification information (e.g., name, account number, address, telephone number), or information related to the service requested (e.g., identifying a service type, whether the call is related to a previous service request) to inbound call manager 104. Customer 102 may provide this information in any number of ways, such as through voice inputs (with voice-to-text translation) or keypad inputs. Inbound call manager 104 may analyze the input information. For example, inbound call manager 104 may score or categorize the call from customer 102 based on at least the input information. Inbound call manager 104 may optionally consider other factors to score or categorize the call from customer 102, such as, for example, a customer or service history of customer 102, the manner (e.g., tone) in which customer 102 provides the information, or any other information.

Inbound call manager 104 may provide the input information received from customer 102, an analysis of the input information, the score or category associated with the call, or any other information to a load balancer 106. In turn, load balancer 106 may decide, based on the data received from inbound call manager 104, how to route the call from customer 102. This may include identifying a particular call center 108. Optionally, the routing may include identifying a particular agent 110 to which the call may be routed.

Load balancer 106 may obtain or monitor information relating to call centers 108 or agents 110. For example, this information may include, but not be limited to, call-answer statistics (e.g., the number of calls answered within a certain amount of time, the number of calls dropped before being answered), call statistics (e.g., average call time, time to resolve calls, number of calls from a particular customer 102 until his/her issue is resolved), the routing protocol (e.g., Avaya, CISCO routing), agent skill level, headcount of agents at a given call center 108, expected delays associated with one or more call centers 108 or agents 110, forecasted call volumes (e.g., by call type, for a time period), or any other statistics or data associated with one or more call centers 108 or agents 110.

Load balancer 106 may engage in rules-based decision making based on the information related to call centers 108, agents 110, or customer 102. These rules may dynamically change. For example, if a queue associated with call center 108a exceeds a threshold, load balancer 106 may dynamically react to shift incoming calls that would otherwise be directed to call center 108a to another call center 108 (e.g., call center 108b). Load balancer 106 may generally direct calls to a particular call center 108. Optionally, load balancer 106 may provide additional information to call center 108 that can be used by call center 108 to identify a particular agent 110 to which the call will be routed. Optionally, load balancer 106 may identify a particular agent 110, type of agent 110, or other aspect of agent 110 at call center 108 to which the call should be routed.

Like load balancer 106, call center 108 may engage in rules-based decision making based on information related to customer 102 or agents 110 associated with call center 108 to route incoming calls. For example, information related to customer 102 or the call may be provided to call center 108 by load balancer 106.

Incoming call from customer 102 may be scored or categorized by one or more of inbound call manager 104 and load balance 106. For example, calls may be categorized based on the age of customer 102, a type of service customer 102 is seeking or may be interested in, family status, job status, military ranking, homeowner status, or any other characteristics that may be beneficial in determining how to route the incoming call.

In an aspect, a call may be scored or evaluated to determine or predict an upsell propensity ("propensity score"). A propensity score may be indicative of how likely customer 102 may be open or interested in discussing products, services, or the like other than the specific reason for customer's call. A propensity score may be assessed on a range (e.g., very likely to not likely at all) or as a binary value (e.g., an indication of whether to engage in upselling with customer 102). Optionally, a propensity score may indicate a type of upselling to be applied to customer 102. For example, a propensity score may indicate customer 102 is open to upselling for one category of services or products, but not another. For example, a propensity score may indicate customer 102 is highly likely to be interested in additional homeowner services but is uninterested (or less interested) in purchasing additional car products or services.

The propensity score may be based on a formula derived from previous sales/call data. For example, by evaluating these types of records, a correlation between customer's age range (e.g., 45-65) and an interest in additional services or products (e.g., retirement planning) may be identified. This information may affect or impact a customer's propensity score. For example, a customer's age may be derived from information acquired by inbound call manager 104. The propensity score for customer 102 aged 56 may be higher than if their age was 32, at least for upselling pertaining to retirement planning. As another example, evaluation of past sales or calls may indicate a correlation between purchasing increased life insurance and certain major life events (e.g., marriage, home purchase, new child, job change). Inbound call manager 102 may ask certain questions that may indicate the occurrence of such major life events, and the occurrence or nonoccurrence of such events may impact the propensity score.

The propensity score may optionally be based on the reason of the call. For example, if customer 102 is calling to fix a high priority (e.g., large dollar value) or emergency (e.g., time sensitive) issue, the propensity score may be lower based on that issue. As another example, analysis of past calls may identify a correlation between customers calling regarding a first type of service and a high upselling rate for a second type of service. For example, customer 102 may be more likely to be interested in increasing a liability coverage amount for a car insurance policy when calling to add another driver or car to the insurance policy. Such information may be factored into his/her propensity score.

The propensity score may optionally be based on the behavior of customer 102. For example, voice analysis of customer's responses to questions or prompts from inbound call manager 104 may indicate a customer's character or mood (e.g., impatient, frustrated) that can be evaluated and correlated to a propensity score. Another customer behavior that may impact the propensity score is the speed at which customer 102 responds to prompts, the number of times customer 102 changes their answer, returns to a previous prompt, or request a prompt be repeated, or the like. A correlation between the speed at which customer 102 completes the information-gathering process performed by inbound call manager 104 may correlate to a propensity for being receptive to upselling. This and any other behavioral attributes of customer 102 may factor into the propensity score of customer 102.

The reason or reasons for customer 102 to make the call may be evaluated and further impact algorithms or processes of load balancer 106. For example, inbound call manager 104 or load balancer 106 may evaluate the complexity or difficulty of an incoming call. This evaluation may consist of categorizing the call (e.g., as low, medium, or high), scoring a call (e.g., on a 10-point scale), or any other evaluation method. This evaluation may be based on the type of services requested by customer 102, such as based on information obtained by inbound call manager 104. For example, the evaluation may be based on a category of services or products relating to the call (e.g., auto insurance, life insurance, household products), or the complexity of customer's request. For example, a call regarding a dishwasher warranty may be categorized as less complex than a call regarding a health insurance policy, or a call regarding adding a beneficiary to an investment fund may be categorized as less complex than a call regarding multiple movements of funds within the investment fund. This categorizing or ranking of the call may be independent of the propensity score.

The categorizing or ranking of the call may depend upon a skill set with which agent 110 may respond to the call. For example, calls that require knowledge in a certain product or service may be categorized together. As another example, certain calls may be grouped together to be answered by a specific type of agent 110 or call center 108. For example, it may be desirable that, when balancing the multiple call centers, load balancer 106 routes all calls regarding auto insurance claims to call center 108c. Additionally or alternatively, load balancer 106 may operate such that all calls regarding life insurance policies not be routed to call center 108b.

Thus, the result of evaluating the call may include a category or ranking of the call, or conditions regarding the handling of the call. For example, the results may include one or more of a call type, a subject matter, a ranking, a categorization, a requirement that the call be directed to (or not directed to) a particular call center 108, an associated skill level it may be desirable for agent 110 answering the call to possess, an estimated time to resolve the call, or the like. Load balancer 106 may use one or more of these results to route the call.

Routing the call may depend upon one or more of the propensity score, the call analysis (e.g., ranking, categorization, or conditions associated with the call), or information regarding call centers 108 or agents 110. Thus, load balancer 106 may comprise one or more processes, methods, or algorithms to route a call based on one or more of these factors.

As those skilled in the art will appreciate, one or more of inbound call manager 104, load balancer 106, call center 108, or agent 110 (e.g., Windows, OS, UNIX, Linux, Solaris, Android, or iOS), various conventional support software, or drivers typically associated with computers. Further, one or more of inbound call manager 104, load balancer 106, call center 108, or agent 110 may include any suitable telephone, personal computer, network computer, workstation, minicomputer, mainframe, tablet, mobile device, or the like. Customer 102 may comprise any combination of hardware or software that can initiate communication with inbound call manager 104.

One or more of inbound call manager 104, load balancer 106, call center 108, or agent 110 may employ any type of database, such as relational, hierarchical, graphical, object-oriented, or other database configurations. Common database products that may be used include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields, or any other data structure. Association of certain data may be accomplished through any desired data association technique, such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, or the like. The association step may be accomplished by a database merge function, for example, using a "primary key field" (hereinafter "key field"), in pre-selected databases or data sectors.

More particularly, a key field may partition a database associated with one or more of inbound call manager 104, load balancer 106, call center 108, or agent 110 according to the high-level class of objects defined by the key field. For example, certain types of data may be designated as a key field in a plurality of related data tables, and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the disclosure, any suitable data storage technique may be utilized to store data without a standard format. Data sets may be stored using any suitable technique, including, for example, storing individual files using an ISO/DEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; or other proprietary techniques, which may include fractal compression methods, image compression methods, or the like.

In one example aspect, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used). By using BLOB methods, the ability to store various data sets that have different formats facilitates the storage of data associated with the system by multiple and unrelated owners of the data sets. For example, a first data set, which may be stored, may be provided by a first party, a second data set, which may be stored, may be provided by an unrelated second party, and yet a third data set, which may be stored, may be provided by a third party unrelated to the first and second party. Each of these three example data sets may contain different information that is stored using different data storage formats or techniques. Further, each data set may contain subsets of data that also may be distinct from other subsets.

As stated above, in various aspects of one or more of inbound call manager 104, load balancer 106, call center 108, or agent 110, the data can be stored without regard to a common format. However, in one example aspect of the disclosure, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, a transaction or membership account identifier, or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on at least the transaction, inbound call manager 104, load balancer 106, call center 108, or agent 110, or the like. Furthermore, the security information may restrict/permit only certain actions such as accessing, modifying, or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one aspect, the header or trailer is not stored on the transaction device along with the associated issuer-owned data, but instead the appropriate action may be taken by providing, to the transaction instrument user at the standalone device, the appropriate option for the action to be taken. A data storage arrangement wherein the header or trailer, or header or trailer history, of the data may be stored on the transaction instrument in relation to the appropriate data. One skilled in the art will also appreciate that, for security reasons, any databases, systems, devices, servers, or other components of one or more of inbound call manager 104, load balancer 106, call center 108, or agent 110 may comprise any combination thereof at a single location or at multiple locations, wherein each database or system includes any of various suitable security features, such as firewalls, access codes, encryption, decryption, compression, decompression, or the like.

Figure 2:
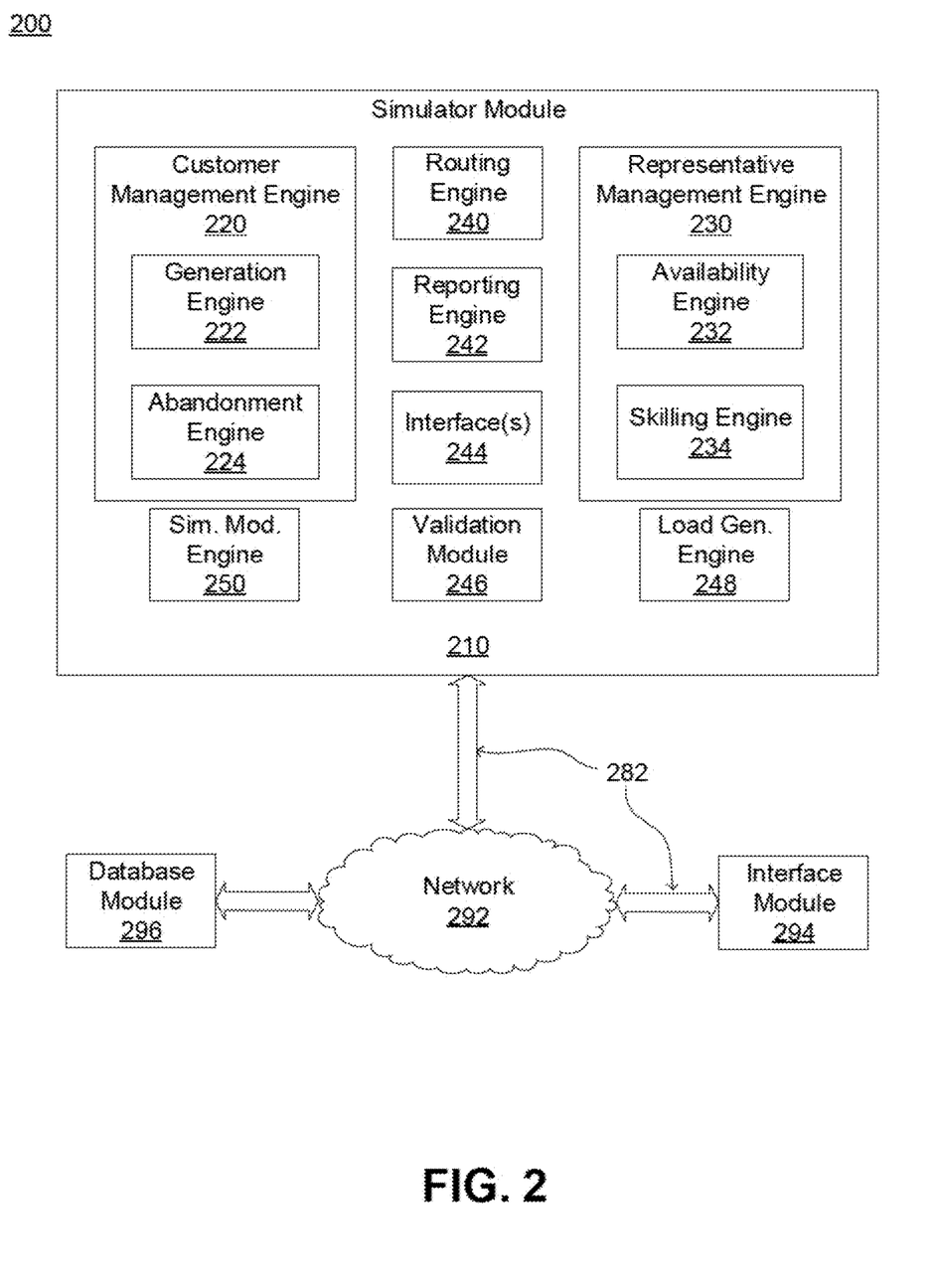
FIG. 2 illustrates a block diagram of an example arrangement involving a simulator module disclosed herein.

Referring to FIG. 2, a diagram depicting a system 200 in which the processes described herein can be executed is provided for example purposes. In one example, system 200 includes simulator module 210, network 250, communications 275, and interface module 260. Simulator module 210 includes customer management engine 220, representative management engine 230, and routing engine 240, whereby customer management engine 220 includes generation engine 222 and abandonment engine 224, and representative management engine 230 includes availability engine 232 and skilling engine 234.

Simulator module 210 can use one or more modeling techniques to simulate call center operations according to one or more modeling technique.

In an embodiment, the modeling technique can be an agent-based model approach whereby one or more individual or collective actors are modeled based on historical data and projections to assess the effects of those actions on call center operations. The actors can include members and member services representatives, or analogous parties, as well as groups thereof, and types and hierarchies therein. For example, members can include members having various accounts, account types, or account parameters; membership levels; membership lengths, et cetera. Each member or group of members can also have various variables associated therewith. Likewise, actors can include Member Service Representatives ("MSRs") and groups thereof, which can include different levels of MSR, seniority, managerial authority, et cetera, along with the skills or variables discussed herein. The actions of each actor, bounded by rationality (e.g., beneficial behavior or historical actions) are aggregated. As used herein, MSR and representative (or other terms for a person responding to an inquiry or input from a client, member, customer, et cetera) may be used interchangeably.

In another embodiment, a hybrid approach is used leveraging both agent-based modeling and discrete-event modeling, or agent-based and fixed-increment-time modeling. In the former, agent-based techniques are utilized with discrete-event modeling (e.g., a single event is run or occurs in the system and the state is re-assessed following "completion" of the event). In the latter, agent-based techniques are utilized with fixed-increment time modeling (e.g., a unit of time is permitted to pass, which may involve zero, one, or more events occurring or decisions or actions by agents).

Regardless of modeling approach, simulator module 210 can accommodate and accumulate some or all available call center management variables. In embodiments, customer management engine module 220 can have one or more interfaces to data sources for determining customer-related variables from one or more databases storing call center data, and/or directly from call centers in a continuous or streaming manner. In embodiments, representative management engine module 230 can have one or more interfaces to data sources for determining representative-related variables from one or more databases storing call center data, and/or directly from call centers in a continuous or streaming manner. In still further embodiments, simulator module 210 can include one or more other interfaces 244 for receiving customer-related, representative-related, or other call center variables from one or more databases, call centers, or call center networks (either by aggregating information from call center networks or through a common interface by which different call center nodes consolidate information). Example variables include, but are not limited to, routing paths, location (e.g., logical or physical call center location; can be addresses, offices, particular call center network hardware, et cetera) and vendor (e.g., internal or external representatives or groups thereof which can be associated with different vendors or entities) load-balancing, agent performance, agent schedule adherence (e.g., timeliness starting and ending shifts, timeliness handling and closing calls or contact, et cetera), agent skills or skilling (e.g., agent knowledge, training, experience, characteristics, et cetera, as it pertains to one or more product, line of business, system, issue, et cetera), call or contact path segments from initial receipt (e.g., to IVR or first responding representative) to completion or abandonment, et cetera. In this manner, call center and call center network models can be a "one-to-one mapping" or digital twin of call center environments and networks. By providing a true-to-reality call center model, a selectively- or all-inclusive "sandbox" or model environment can be provided to test different algorithms, constraints, or techniques for, e.g., routing, load-balancing, skilling, scheduling, robustness, risk, and capacity planning based on different scenarios or cases. Artificial intelligence can also be applied to or trained/developed from the digital twin call center, network, or environment. In particular, stress testing can be performed to ensure compliance with requirements or quality of service metrics.

In an embodiment, customer management engine 220 can include one or more interfaces configured to ingest information regarding one or more members (up to and including, but not requiring, all members of an organization, or all members interacting with a call center network). The information relating to the members models the members' information and behavioral attributes. This can include, but is not limited to, member name, membership history, accounts, observable mood behavior (e.g., from interactions with representatives, from other sources), propensity scores for engagement (e.g., likelihood to deepen (e.g., enroll in additional products, increase satisfaction, increase referrals), churn (e.g., disenroll, cancel, or "shallow"), switch channels (e.g., change manner of contact with the entity corresponding with members via call centers), patience (e.g., time until member mood change or abandonment of call/contact).

In embodiments, member or caller attributes (e.g., patience, characteristics, attitude, and behaviors) (in embodiments, as identified related to an incoming call) can be determined through one or more of machine learning on historical data, forecasting, or live-intent NLP parsing. Once modeled, member attributes may be stored for deterministic simulations or used in the agent-based framework for creating non-deterministic modeled caller behaviors.

Similarly, in one or more complementary or alternative embodiments, representative management engine can include one or more interfaces configured to ingest information regarding one or more representatives (up to and including, but not requiring, all representatives of an organization, or all representatives within a call center network). Attributes associated with each of the representatives can include skills and skill levels, efficiency, scheduling, schedule adherence, MSAT score, et cetera.

As with members/callers, MSR behavioral attributes, skills, and scheduling can be determined through historical tracking and are either stored for deterministic simulations or used in the agent-based framework for creating non-deterministic modeled MSR behaviors. Representative attributes can be determined through historical tracking and/or machine learning and are either stored for deterministic simulations or used in the agent-based framework for creating non-deterministic modeled routing behaviors.

One or both of customer management engine 220 or representative management engine 230 (or simulator module 210) can include one or more interfaces configured to ingest call attributes for calls associated with each member. The call attributes may include a type of call (e.g., reason, transaction, associated product or service), complexity, propensity scores for engagement associated with the score, skills required, time to route, time to complete, other duration, type of routing or Precision Queue routing applied, et cetera.

In embodiments, data ingested by one or both of the customer management engine 220 and/or the representative management engine 230 can be anonymized or otherwise scrubbed to allow for its use without violating policies or risking data breaches.

In embodiments, call attributes may indicate the call duration, the complexity of the call, the types of call or Precision Queue (PQ) routing, as well as any associated logic that affects the distribution of the call to specific MSR are determined through detailed historical tracking and IVR records, and are either stored for deterministic simulations or used in the agent-based framework for creating non-deterministic modeled call behaviors.

An interface of simulator module 210 can also include an interface to ingest or receive routing logic that governs the distribution of incoming calls to particular representatives. This can include logic embodied in software or hardware (e.g., physical routers, switches, servers, et cetera), which can be provided as code or modeled to arrive at functionality substantially similar or identical to the code or circuitry operating in the real-world call center or call center network. Associated logic that impacts the distribution of the call to a specific representative can also be provided or determined through tracking (e.g., historical data, IVR records, et cetera).

Routing logic can be categorized according to several scenarios or situations. In an embodiment, direct routing can be evaluated where the PQ of the call is known upon arrival; or where the PQ is not known upon arrival and instead the call is sourced by call type and routed through a load-balancing algorithm that can be unique to the call type and will be assigned a PQ. In alternative or complementary embodiments, attribute-based routing of calls can be evaluated where the PQ of the call is known but the routing has specialized logic to accommodate operational targets or matching to a particular MSR.

When interfaces of system 200 ingest data, they may maintain the data as-is for deterministic simulations based on a historical day (e.g., average day, day of week, day of year, et cetera) or as initializations for behavior in the non-deterministic agent-based modeling. In further embodiments, data ingested can be used to execute or simulate a full routing model, from call arrival to abandonment or completion, including but not limited to parameters for queuing, abandonment, call handling, call transfers. Such a model can be implemented through discrete scheduled events or non-deterministic modeled behaviors.

Various outputs can be provided from digital twin models through, e.g., reporting engine 242. Real-time demand and performance can be received and ingested to the model, or separate inputs can be provided to simulate call volume and other variables to calculate the performance of the digital twin. In embodiments, various reports can be generated intra-simulation or based on accumulated simulation information over a time period. Reports can be provided in delimited files containing various datapoints of information, such as csv files, or in other quantitative or qualitative manners. In embodiments, real-time performance, or performance at a selected time, can be depicted or monitored on a dynamic dashboard, which may be similar to dashboards used to monitor live, production call centers or call center networks, or which may be particular to the digital twin environment. In embodiments, information in reports or on dynamic displays can include, but is not limited to, PQ usages, MSR schedule adherences, service indices, net abandonments (at different times or junctures in the routing), attribute-based call matching target successes, et cetera.

In embodiments, reporting engine 242 (or other aspects of system 200) can include a validation module 246 to determine the accuracy of the model compared with the known behavior of the call center or call center network based on known behavior of or data associated with the call center or call center network. In embodiments, system 200 can include PQ and global validation metrics, by which the validation module can calculated accuracy of simulated PQs. In embodiments, these metrics can be based on operational targets that are developed arbitrarily (e.g., variable values within a certain percentage of real-world value; may vary by variable, or variables may be weighted for composite), using artificial intelligence or machine learning, or by personnel (e.g., subject matter experts) who define thresholds of acceptable error boundaries. In embodiments, when a digital twin fails to validate or falls outside desired accuracy or precision bounds, a calibration module of simulator module 210 can perform algorithmic calibration to modify the digital twin to increase accuracy or precision. In an embodiment, given known targets of call center metrics (including but not limited to abandonments, call volumes, and service index per priority queue), an output rendered by reporting engine or other aspects of simulator module 210 can be tuned to reproduce those or other metrics metrics within a defined accuracy per PQ using high-dimensional gradient free stochastic optimization routines until the some or all metrics are validated. In embodiments, socially stochastic variables including but not limited to caller patience or MSR efficiency can be adjusted from their default variables by the calibration module due to simulation unknowns to tune the digital twin.

In embodiments, simulator module 210 can include a load generation engine 248. Load generation engine can generate a load or call volume to impose on the model(s) or simulation(s) of simulator module 210. The load or call volume can be based on real-world call information received, or can be generated based on a scenario (which may or may not be reflective of real-world circumstances in the call center network on which the simulation(s) or model(s) are based).

In embodiments, simulator module 210 can include a simulation modification engine configured to change one or more of the parameters defining simulation(s) or model(s) generated by simulator module 210. In this manner, new customer/member parameters can be tested, new representative parameters can be tested, and/or new routing or load balancing parameters or algorithms can be tested. In this manner, a digital twin can be used to provide a highly accurate test regarding performance of the call center based on changes to membership, representatives, or routing and/or load balancing logic. The performance of the digital twin can be recorded and monitored, and provided as an output to allow for feedback before such changes occur in a production environment; thereby enabling the call center network to plan for possible changes to membership or representatives, and/or validate or reject new load balancing or call routing algorithms based on their performance before such are implemented in a manner impacting quality of service.

Referring further to FIG. 2, it is to be appreciated that network 250 depicted in FIG. 2 may include a local area network (LAN), a wide area network (WAN), a personal area network (PAN), and/or combinations thereof, or various other networks used to implement call centers or in call center networks. Such networking environments are commonplace in offices, enterprise-wide computer networks, intranets, and the Internet. For instance, when used in a LAN networking environment, the system 200 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 200, or portions thereof, may be stored in a remote memory storage device such as storage medium. Communication links 75 may comprise either wired or wireless links. It is to be appreciated that the illustrated network connections of FIG. 2 are example and other means of establishing a communications link between multiple devices may be used.

Figure 3:
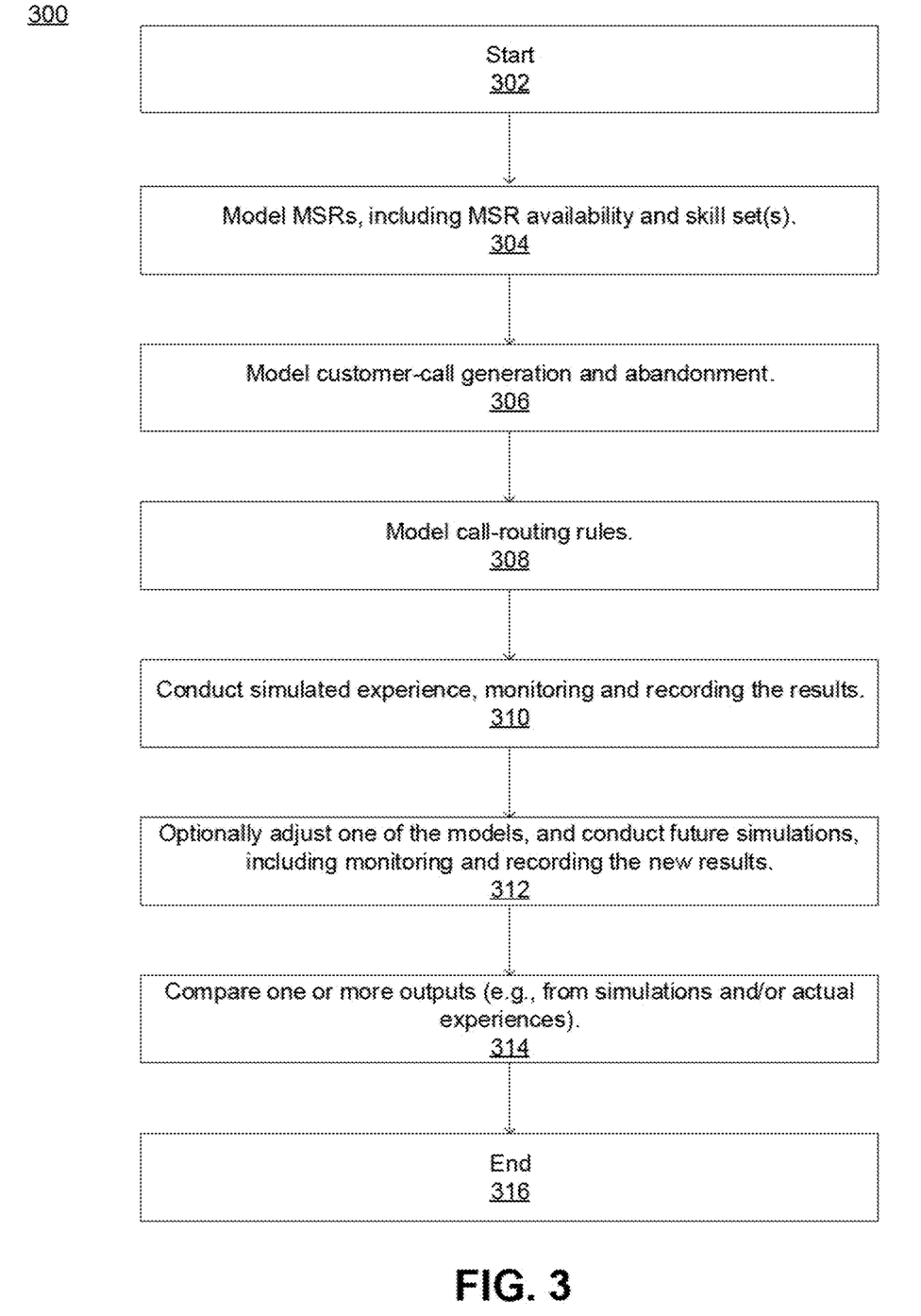
FIG. 3 illustrates an example process flow depicting aspects for modeling call centers or call center networks.

Turning now to FIG. 3, example operation process 300 (which can, but need not, utilize system 200) will now be described for illustrative purposes. Process 300 begins at 302 and proceeds to 304 when, representatives are modeled. This may but need not be performed via representative management engine 230. The availability of specific MSRs are identified (both on a daily basis in terms of sickness and/or vacation, and also on an hourly basis in terms of scheduled and/or unscheduled work breaks) and the skill set(s) for the MSRs are also identified. The modeling may be based on previous availability and skill set(s) that have been recorded, and/or it may be customized based on a projection (e.g., if a certain number of MSRs with certain skill(s) are employed). Such projection modeling may be utilized to experiment on and experience how certain configurations would perform.

In one or more embodiments, MSRs may be modeled to have multiple skill sets (any number, including up to dozens). Further, modeling of MSRs may also account for individual characteristics, and that one or more MSRs or groups thereof have different attendance expectations than other skill sets (e.g., home insurance MSRs may rarely miss work for being sick, whereas car insurance MSRs may miss work slightly more often; MSRs with two or more years of service may have better attendance than junior MSRs; et cetera).

In an embodiment, the model of MSRs can be its own model, or nested in a larger model of an entire call center or call center network. The MSR modeling can be a digital twin of the MSR staffing at a given point in time, over a period of time, or in real-time or near-real-time based on actual MSR staffing, characteristics, behavior, and/or performance.

Customer calls (and/or other loads) are generated and abandonment information is modeled at 306. This modeling may be based on previously measured actual customer calls and abandonment situations, and/or customized therefrom. For example, if an insurance company wanted to test their customer call center for a wide-area event (e.g., hurricane), the simulator may be configured to simulate a certain type and number of customers (e.g., a very large number of customer calls relative to normal operating situations, and the calls may have delayed abandonment parameters because the customers have experienced a serious event that requires insurance coverage no matter how long the wait). In embodiments, demand on a call center or call center network can be a digital twin of demand experienced at a given point in time, over a period of time, or in real-time or near-real-time based on actual demand or load.

During modeling of customers, specific customer traits may be modeled. For example, the customer's age, job, job rank (e.g., military rank), and/or geographical location may be determined. As suggested, various specific characteristics or variables associated with members (or prospective or former members) can be modeled to develop a digital twin.

Call routing rules may be modeled at 308. In one embodiment, the rules will inform and/or dictate how the simulated calls will be routed (e.g., between human representatives, between automated representative systems and human representatives, and/or between automated representative systems). The selection of the rules, and more particularly, how the rules function to route actual calls, can be influential with respect to the efficiency of how the (simulated) calls are handled. For example, if a relatively high percentage of calls are routed to a wrong destination (e.g., a representative that cannot help the customer with what they are calling about), then not only is that customer inconvenienced, but also that representative has had their time wasted. Accordingly, the effectiveness of the call routing (e.g., triage) can be a very important factor for not only simulated call centers, but also the functioning of actual call centers. In embodiments, call routing rules can be a digital twin of the real-world call routing and load balancing rules and algorithms at a given point in time, over a period of time, or in real-time or near-real-time. In an embodiment, the algorithms for each call routing and/or load balancing technique are provided to the model in code or pseudocode. In embodiments, provided algorithms can be provided or received in two or more formats and converted to a common format or language. In embodiments, outcomes from call routing and load balancing can be modeled to simulate the call routing and/or load balancing algorithms without actually receiving the algorithms themselves. In embodiments, a combination of receiving algorithms and modeling can be utilized.

The call routing rules may be informed by customer characteristics. For example, the age of a simulated customer may be utilized to dictate and/or inform the likelihood that the customer wishes to be routed to an MSR with a specific skill (e.g., home mortgage refinancing). In another example, if a certain MSR group is getting overrun with calls, the routing rules may identify another MSR group that may be utilized to assist the overwhelmed group (in this example, there may be a threshold (e.g., hold times of at least 15 minutes) before another group is assigned to assist the overwhelmed group). In another example, one or more rules may be related to routing the customer's phone call based on other characteristics of the customer, such as the customer's family status, job status (including military rank), homeowner status, and/or any other characteristics as would be recognized by those skilled in the art.

At 310, a call center simulation is run by simulating a call center situation, circumstances, and/or time duration of operation using the model(s). For example, the system could be configured to simulate a typical day/week/hour. The simulation will produce output that is representative of how the simulation went. For example, the output may include the (mean) average wait time, the (mean) average call handling time, the standard deviation for each (e.g., was there a wild variance or not), average number of call transfers, abandonments per skill and/or day, MSR group utilization rates per group/skill/day, call volumes and abandonments per MSR group/day, and/or any other factors/measurements as would be recognized by those skilled in the art. In embodiments, the call center situation and/or time duration can be a digital twin of the call center and its variables (or multiple call centers and/or a call center network and all variables inherent therein, including duplicates of variables that may be the same or different at different call centers within a call center network) for the given situation and/or time duration. In embodiments, the duration can be a specific time period (e.g., by calendar or by event). In embodiments, the duration can be real-time or narrowly trailing real-time (e.g., on a fixed delay). In embodiments, a duration can be a fixed period of time (e.g., 30 minutes, a portion or a whole shift, or another length) given circumstances for said period of time.

After a digital twin (or other model) is established, one or more of the above described models or variables therein may be adjusted at 312 and new measurements/results may be obtained. Results can include, e.g., wait times, abandonment, completion, MSR utilization, accuracy of skilling/knowledge match in call routing or load balancing, load balance between different call centers or MSRs, et cetera, to include any and all metrics for performance for MSRs, in call centers, and in call center networks. Results of the unmodified digital twin and the modified digital twin may be compared between one or more simulations and/or one or more actual call center handling experiences at 314. In this regard, after a digital twin of a call center or call center network (or other models) are developed, they can be used to test changes before those changes are implemented in production. The changes may include, but need not be limited to, changes to MSRs or MSR staffing, changes to load balancing and/or call routing algorithms, changes to demand or loads, et cetera. In this manner, During model adjustment at 312, various combinations of inter-skilling may be experimented with. For example, various patterns of MSRs having two or more skills may be tested to determine which combination(s) produce the most favorable simulation results. Further, the simulations also account for and communicate how many MSRs are being utilized, and to accordingly rate simulations with fewer MSRs as being less costly (e.g., because facility and employment costs would be lower). In embodiments, modeling may be utilized to determine which cross-skill training results in the greatest benefit as compared against the cost of doing the training.

In embodiments, process 300 can include additional steps for reporting. Changes implemented at 312 (or during/using other aspects) can be tested in a modeled or simulated environment using the digital twin (or other) model. The performance and outcomes of the changes to the model—which can include, e.g., performance based on stress test loads, changes to MSR skilling or staffing, changes to call routing or load balancing algorithms, et cetera—can be provided as output. The output may be in reports, may be presented on graphical user interfaces, or may be provided in other manners.

As will be understood, process 300 need not proceed in the order illustrated, and aspects can be performed in different orders, simultaneously, or in other manners to generate and maintain a digital twin without departing from the scope or spirit of the innovation.

Figure 4:
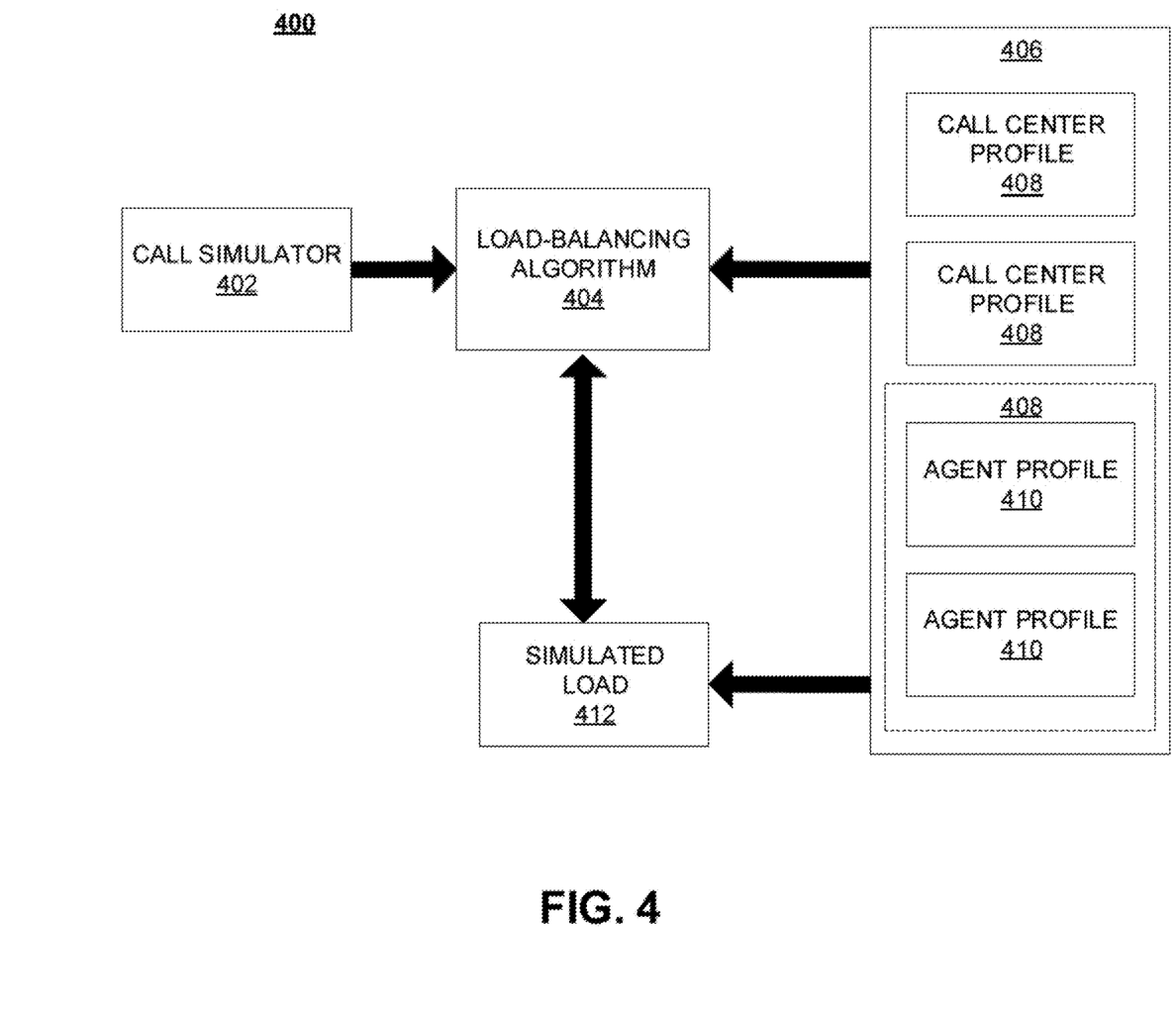
FIG. 4 is a block diagram a data flow of an example simulator.

FIG. 4 is a block diagram of a simulator 400 that may be used to simulate environment 100 as described herein. Simulator 400 may include a call simulator 402 that inputs simulated "calls" that can be used to determine an impact of different load-balancing methods on call centers 108. For example, a call simulator 402 may periodically output one or more simulated calls based on historical or estimated call input rates. The simulated calls may include raw call data, such as user answers to prompts from inbound call manager 104. In an aspect, simulated calls may be call scores, including, for example, propensity scores, call complexity (e.g., low, medium, high), or the like, as discussed above. Call simulator 402 may provide simulated calls to load-balancing algorithm 404.

Simulator 400 may comprise or access profiles 406 regarding one or more call center 108 or agent 110. Profiles 406 may comprise one or more call center profiles 408. In turn, call center profile may optionally comprise one or more agent profiles 406.

Call center profiles 408 may be based on demographic data associated with call center 108 or associated agents 110, including head count, skill level, or the like, based on current information. Call center profile 408 may comprise information to simulate typical or average performance of a respective call center 108. This average performance may be a snapshot of call center performance for a period of time (e.g., an average hour, day, week, or month), or a specific period of time (e.g., an average noon hour, Tuesday, or Thanksgiving), or a historical snapshot (e.g., Jan. 8, 2011, or the last week of 4004). This information, when used to simulate a load, may output performance data such as the (mean) average wait time, (mean) average call handling time, standard deviation for each, average number of call transfers, abandonments per skill and/or day, agent group utilization rates (e.g., per group, skill, or period of time), call volumes and abandonments (e.g., per group, skill, or period of time), or any other factors or measurements of call center activity or performance.

Call center profiles 408 may include predicted performance of associated call centers 108, and agent profiles 410 may include predicted performance of associated agents 110. The predicted performance may include, for example, throughput, time-per-call, success rates, or the like. The predicted performance may further be broken down by call type, call complexity, propensity score, or the like. Predicted performance may be based on actual past performance thereof or based on an analysis of the demographics of call centers 108 or agents 110. For example, if call center profile 408 associated with call center 108 does not have historical performance data of call center 108 (e.g., because call center 108 is new or agents 110 comprising call center 108 are new), call center profile 408 may predict or approximate expected performance associated with call center 108 based on historical trends based on call center profiles 408 or agent profiles 410 that have a number of shared demographics with the particular call center 108.

Profiles 406 may be static or dynamic. For example, profiles 406 may be adjusted based on actual collected data regarding the performance of call centers 108 or agents 110, changes in personnel at call centers 108, the acquisition by agents 110 of new skills or training, attendance, or the like.

Agent profiles 410 may be used to model specific personnel or a category of call center employee. For example, different agent profiles 410 may exist for different types of agents 110, such as based on demographic information of agents 110. For example, different agent profiles 410 may model agents specializing in specific areas (e.g., home insurance, car insurance), with specific skill sets (e.g., multilingual), or the like.

Load-balancing algorithm 404 may use profiles 406 to route simulated calls from call simulator 402 to particular call centers 108 or agents 110 associated with the respective profiles 406. The output of load-balancing algorithm 404 may be provided to a simulated load 412. Simulated load 412 may simulate activity of call centers 108 or agents 110 based on simulated calls assigned to the respective call centers 108 or agents 110 and based on profiles 406 associated with each of the respective call centers 108 or agents 110. In an aspect simulated load 412 allows for evaluation of the efficacy of load-balancing algorithm 404 without actually having to implement load-balancing algorithm 404 in a life call center environment. This may allow adjusting or fine-tuning of load-balancing algorithm 404.

Load-balancing algorithm 404 may use simulated load 412 when routing simulated calls. For example, load-balancing algorithm 404 may route simulated calls based at least in part on queue lengths associated with one or more call centers 108 or agents 110. In this manner, a feedback loop between load-balancing algorithm 404 and simulated load 412 may be used to evaluate or adjust load-balancing algorithm 404.

Simulator 400 may optionally be used to test load-balancing algorithms 404 of specific call centers 108. In an aspect, Load-balancing algorithm 404 may use profiles 406 to route simulated calls from call simulator 402 to particular agents 110 within call center 108 that are associated with the respective profiles 406. The output of load-balancing algorithm 404 may be provided to a simulated load 412. Simulated load 412 may simulate activity of agents 110 within call center 108 based on simulated calls assigned to agents 110 within call center 108 and based on profiles 406 associated with each of the respective agents 110. In an aspect simulated load 412 allows for evaluation of the efficacy of load-balancing algorithm 404 without actually having to implement load-balancing algorithm 404 in a life call center environment. This may allow adjusting or fine-tuning of load-balancing algorithm 404.

Load-balancing algorithm 404 may use simulated load 412 when routing simulated calls. For example, load-balancing algorithm 404 may route simulated calls based at least in part on queue lengths associated with one or more agents 110. In this manner, a feedback loop between load-balancing algorithm 404 and simulated load 412 may be used to evaluate or adjust load-balancing algorithm 404.

Figure 5:
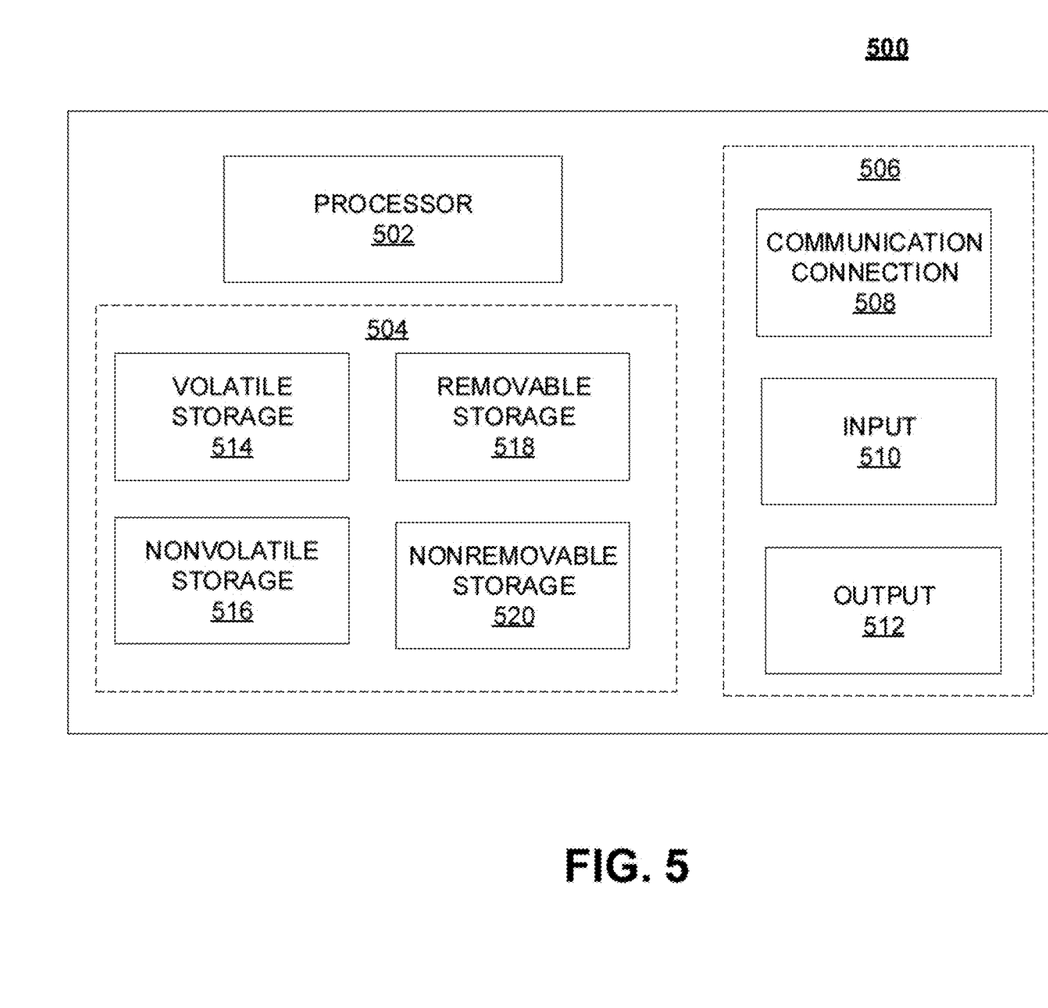
FIG. 5 is a block diagram illustrating an example implementation of a simulator device.

Device 500 may comprise all or a part of simulator 400. Device 500 may comprise hardware or a combination of hardware and software. The functionality to facilitate telecommunications via a telecommunications network may reside in one or combination of network devices 500. Device 500 depicted in FIG. 2 may represent or perform functionality of an appropriate device 500, or combination of network devices 500, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 2 is example and not intended to imply a limitation to a specific implementation or configuration. Thus, device 500 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Device 500 may comprise a processor 502 and a memory 504 coupled to processor 502. Memory 504 may contain executable instructions that, when executed by processor 502, cause processor 502 to effectuate operations associated with mapping wireless signal strength. As evident from the description herein, device 500 is not to be construed as software per se.

In addition to processor 502 and memory 504, device 500 may include an input/output system 506. Processor 502, memory 504, and input/output system 506 may be coupled together (coupling not shown in FIG. 2) to allow communications therebetween. Each portion of device 500 may comprise circuitry for performing functions associated with each respective portion. Thus, each portion may comprise hardware, or a combination of hardware and software. Accordingly, each portion of device 500 is not to be construed as software per se. Input/output system 506 may be capable of receiving or providing information from or to a communications device or other network entities configured for telecommunications. For example input/output system 506 may include a wireless communications (e.g., WiFi/2.5G/3G/4G/GPS) card. Input/output system 506 may be capable of receiving or sending video information, audio information, control information, image information, data, or any combination thereof. Input/output system 506 may be capable of transferring information with device 500. In various configurations, input/output system 506 may receive or provide information via any appropriate means, such as, for example, optical means (e.g., infrared), electromagnetic means (e.g., radio frequency (RF), WiFi, Bluetooth®, ZigBee®), acoustic means (e.g., speaker, microphone, ultrasonic receiver, ultrasonic transmitter), or a combination thereof. In an example configuration, input/output system 506 may comprise a WiFi finder, a two-way GPS chipset or equivalent, or the like, or a combination thereof.

Input/output system 506 of device 500 also may contain communication connection 508 that allows device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with telecommunications, such as functions for processing broadcast messages, as described herein. For example, processor 502 may be capable of, in conjunction with any other portion of device 500, determining a type of broadcast message and acting according to the broadcast message type or content, as described herein.

Memory 504 of device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with telecommunications. Depending upon the exact configuration or type of processor, memory 504 may include a volatile storage 514 (such as some types of random access memory), a nonvolatile storage 516 (such as ROM, flash memory), or a combination thereof. Memory 504 may include additional storage (e.g., a removable storage 518 or a nonremovable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 500. Memory 504 may comprise executable instructions that, when executed by processor 502, cause processor 502 to effectuate operations to map signal strengths in an area of interest.

Figure 6:
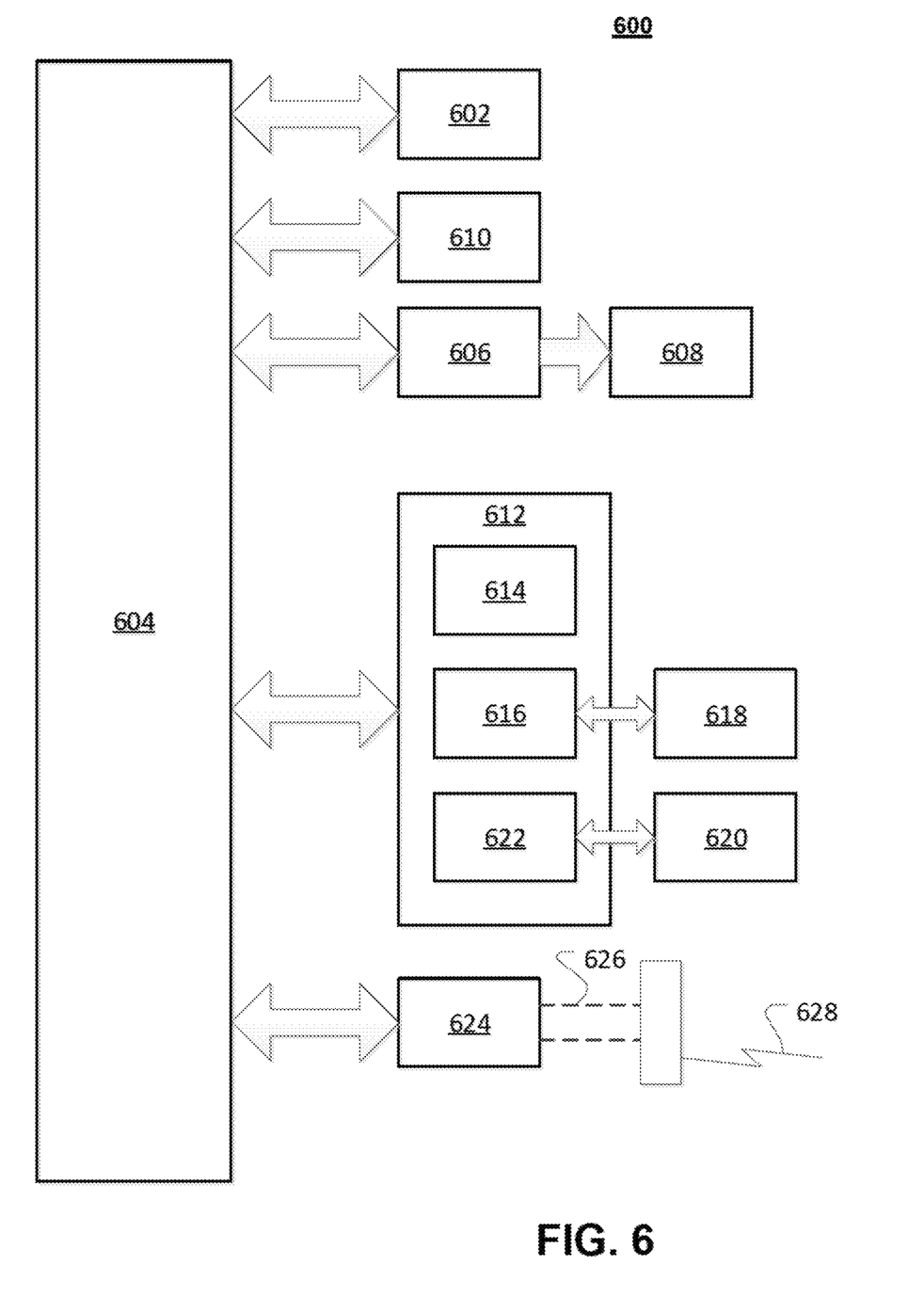
FIG. 6 is a block diagram of an example computer system that may comprise all or a portion of an example simulator.

FIG. 6 illustrates a computer-based system 600 that may constitute or include parts of one or more of inbound call manager 104, load balancer 106, call center 108, agent 110, or device 500. Computer-based system 600 includes at least one processor, such as a processor 602. Processor 602 may be connected to a communication infrastructure 604, for example, a communications bus, a cross-over bar, a network, or the like. Various software aspects are described in terms of this example computer-based system 600. Upon perusal of the present description, it will become apparent to a person skilled in the relevant art(s) how to implement the present disclosure using other computer systems or architectures.

Computer-based system 600 includes a display interface 606 that forwards graphics, text, or other data from communication infrastructure 604 or from a frame buffer (not shown) for display on a display unit 608.

Computer-based system 600 further includes a main memory 610, such as random access memory (RAM), and may also include a secondary memory 612. Secondary memory 612 may further include, for example, a hard disk drive 614 or a removable storage drive 616, representing a floppy disk drive, a magnetic tape drive, an optical disk drive, etc. Removable storage drive 616 reads from or writes to a removable storage unit 618 in a well-known manner. Removable storage unit 618 may represent a floppy disk, magnetic tape, or an optical disk, and may be read by and written to by removable storage drive 616. As will be appreciated, removable storage unit 618 includes a computer usable storage medium having computer software or data stored therein.

In accordance with various aspects of the present disclosure, secondary memory 612 may include other similar devices for allowing computer programs or other instructions to be loaded into computer-based system 600. Such devices may include, for example, a removable storage unit 620 and an interface 622. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 620 to computer-based system 600.

Computer-based system 600 may further include communication interface 624. Communication interface 624 may allow software or data to be transferred between computer-based system 600 and external devices. Examples of communication interface 624 include, but may not be limited to a modem, a network interface (such as an Ethernet card), a communications port, a Personal Computer Memory Card International Association (PCMCIA) slot and card, or the like. Software or data transferred via communication interface 624 may be in the form of a number of signals, hereinafter referred to as signals 626, which may be electronic, electromagnetic, optical or other signals capable of being received by communication interface 624. Signals 626 may be provided to communication interface 624 via a communication path (e.g., channel) 628. Communication path 628 carries signals 626 and may be implemented using wire or cable, fiber optics, a telephone line, a cellular link, an RF link, or other communication channels.

In this document, the terms "computer program medium" and "computer usable medium" are used to generally refer to media such as removable storage drive 616, a hard disk installed in hard disk drive 614, or the like. These computer program products provide software to computer-based system 600. The present disclosure is directed to such computer program products.

Computer programs (also referred to as computer control logic) may be stored in main memory 610 or secondary memory 612. The computer programs may also be received via communication interface 604. Such computer programs, when executed, enable computer-based system 600 to perform the functions consistent with the present disclosure, as discussed herein. In particular, the computer programs, when executed, enable processor 602 to perform the features of the present disclosure. Accordingly, such computer programs represent controllers of computer-based system 600.

In accordance with an aspect of the present disclosure, where the disclosure is implemented using a software, the software may be stored in a computer program product and loaded into computer-based system 600 using removable storage drive 616, hard disk drive 614, or communication interface 624. The control logic (software), when executed by processor 602, causes processor 602 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special purpose computer, or other programmable data-processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network based portal.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed:

1. A non-transitory computer-readable medium storing instructions that when executed by a processor perform a method comprising:

ingesting, via an interface with a call center network, member data representing one or more attributes of members associated with one or more calls to the call center network;

ingesting, via an interface with the call center network, representative data representing one or more attributes of representatives handling the one or more calls to the call center network;

ingesting, via an interface with the call center network, routing data representing routing logic for assigning the one or more calls to a respective one of the representatives, wherein the routing logic models at least one proprietary routing protocol used in the call center network;

generating a digital twin of the call center network based on the member data, the representative data, and the routing data;

providing simulated call load data to the digital twin, wherein the simulated call load data includes call attribute data describing one or more calls, wherein the call attribute data includes, for each of the one or more calls, one or more of a call issue, a caller tone of voice, words per minute, changed answers to the same question, returning to an earlier step in a process, or requesting repetition of information, and wherein the simulated call load data is routed based on the routing logic and the call attribute data;

calculating performance of the call center network based on handling of the simulated call load by the digital twin; and providing an output representing the performance.

2. The non-transitory computer-readable medium of claim 1, wherein the member data includes one or more of member behavior and member account data.

3. The non-transitory computer-readable medium of claim 1, wherein the representative data includes one or more of representative skilling and representative scheduling.

4. The non-transitory computer-readable medium of claim 1, wherein the routing data comprises code for one or more algorithms for the routing logic.

5. The non-transitory computer-readable medium of claim 1, wherein the routing data includes results implemented by the routing logic based on at least the member data and the representative data.

6. The non-transitory computer-readable medium of claim 1, wherein one or more of the member data, the representative data, or the routing data is updated based on a change related to the call center network.

7. The non-transitory computer-readable medium of claim 6, wherein the method comprises:
receiving information regarding the change from an interface of the call center network.

8. The non-transitory computer-readable medium of claim 6, wherein the method comprises:
polling the call center network to determine a change after an interval of time.

9. Non-transitory computer-readable medium of claim 1, wherein the method comprises:
anonymizing at least one of the member data and the representative data during ingestion.

10. The non-transitory computer-readable medium of claim 1, the method comprises:
effecting a change one or more of the member data, the representative data, or the routing data, wherein calculating performance of the call center network is further based on the change.

11. The non-transitory computer-readable medium of claim 1, wherein the output is provided as a written report.

12. The non-transitory computer-readable medium of claim 1, wherein the output is displayed on a dashboard.

13. A non-transitory computer-readable medium storing instructions that when executed by a processor effectuate:
a simulator module;
a customer management engine configured to ingest member data representing one or more attributes of members associated with one or more calls to a call center network;
a representative management engine configured to ingest representative data representing one or more attributes of representatives handling the one or more calls to the call center network;
a load generation engine configured to generate a simulated call load, wherein the simulated call load data includes call attribute data describing one or more calls, wherein the call attribute data includes for each of the one or more calls, one or more of a call issue, a caller tone of voice, words per minute, changed answers to the same question, returning to an earlier step in a process, or requesting repetition of information; and
a routing engine configured to ingest routing data representing routing logic for assigning the one or more calls to a respective one of the representatives, wherein the simulated call load data is routed based on the routing logic and the call attribute data, wherein the routing logic models at least one proprietary routing protocol used in the call center network, and
wherein the simulator module is configured to generate a digital twin of the call center network based on the member data, the representative data, and the routing data.

14. The non-transitory computer-readable medium of claim 13, wherein the instructions effectuate:
a validation module configured to receive performance data from the call center network and validate the digital twin based on the performance data.

15. The non-transitory computer-readable medium of claim 13, wherein the instructions effectuate:
a load generation engine configured to generate a simulated call load to apply to the digital twin.

16. The non-transitory computer-readable medium of claim 15, wherein the instructions effectuate:
a reporting module configured to provide an output representing performance of the digital twin based on the simulated call load.

17. The non-transitory computer-readable medium of claim 13, wherein the instructions effectuate:
a simulation modification engine configured to modify at least one variable of the digital twin.

18. The non-transitory computer-readable medium of claim 13, wherein the simulator module is configured to modify the digital twin based on a change to one or more of the member data, the representative data, and the routing data.

19. The non-transitory computer-readable medium of claim 13, wherein the customer management engine anonymizes at least one of the member data and the representative data during ingestion.

20. A computer program product stored on a non-transitory computer-readable medium, the computer program product configured to:
ingest, via an interface with a call center network, member data representing one or more attributes of members associated with one or more calls to the call center network;
ingest, via an interface with the call center network, representative data representing one or more attributes of representatives handling the one or more calls to the call center network;
ingest, via an interface with the call center network, routing data representing routing logic for assigning the one or more calls to a respective one of the representatives, wherein the routing logic models at least one proprietary routing protocol used in the call center network;
generate a digital twin of the call center network based on the member data, the representative data, and the routing data;
provide simulated call load data to the digital twin, wherein the simulated call load data includes call attribute data describing one or more calls, wherein the call attribute data includes, for each of the one or more calls, one or more of a call issue, a caller tone of voice, words per minute, changed answers to the same question, returning to an earlier step in a process, or requesting repetition of information, and wherein the simulated call load data is routed based on the routing logic and the call attribute data;
calculate performance of the call center network based on handling of the simulated call load by the digital twin; and
provide an output representing the performance.

* * * * *